(12) United States Patent
Tandon et al.

(10) Patent No.: US 11,330,939 B2
(45) Date of Patent: May 17, 2022

(54) CUTTING BOARD WITH INTEGRATED FOOD HOLDERS

(71) Applicants: Amit Tandon, Carson, CA (US);
Anuraag A. Tandon, Carson, CA (US)

(72) Inventors: Amit Tandon, Carson, CA (US);
Anuraag A. Tandon, Carson, CA (US)

( * ) Notice: Subject to any disclaimer, the term of this patent is extended or adjusted under 35 U.S.C. 154(b) by 174 days.

(21) Appl. No.: 16/824,392

(22) Filed: Mar. 19, 2020

(65) Prior Publication Data

US 2020/0297168 A1    Sep. 24, 2020

Related U.S. Application Data

(60) Provisional application No. 62/858,081, filed on Jun. 6, 2019, provisional application No. 62/820,379, filed on Mar. 19, 2019.

(51) Int. Cl.
  *B23Q 3/00*    (2006.01)
  *A47J 47/00*   (2006.01)
  *A47J 47/16*   (2006.01)

(52) U.S. Cl.
  CPC ............. *A47J 47/005* (2013.01); *A47J 47/16* (2013.01)

(58) Field of Classification Search
  CPC .............................. A47J 47/005; A47J 47/16
  See application file for complete search history.

(56) References Cited

U.S. PATENT DOCUMENTS

| | | | | |
|---|---|---|---|---|
| 2,756,457 A | * | 7/1956 | Banowetz, Sr. | A22C 25/06 452/195 |
| 2,932,849 A | * | 4/1960 | Missman | A22C 25/006 452/196 |
| 5,522,765 A | * | 6/1996 | Dotson | A22C 25/06 452/194 |
| 5,546,852 A | * | 8/1996 | Bidwell | A47J 47/005 210/259 |

\* cited by examiner

*Primary Examiner* — Lee D Wilson

(57) ABSTRACT

A cutting board apparatus is provided. The cutting board apparatus assists users with disabilities that would impede their ability to slice cutting articles. Additionally, the cutting board apparatus provides a safe cutting platform for new and inexperienced users. The cutting board apparatus contains a cutting board base, at least one hinge, and at least one cutting article holder. Each of the cutting article holders is hingedly connected adjacent to the cutting board base through one of the at least one hinge. The user can place a cutting article along the cutting board base. The user can then rotate the cutting article holder adjacent to the cutting article, where the cutting article holder will secure the cutting article in place atop the base. The user can then use any type of cutting implement to perform slicing operations without having their assist hand close to the cutting article.

15 Claims, 13 Drawing Sheets

14

CUTTING BOARD WITH INTEGRATED FOOD HOLDERS

The current application claims a priority to the U.S. Provisional Patent application Ser. No. 62/820,379 filed on Mar. 20, 2019. The current application also claims a priority to the U.S. Provisional Patent application Ser. No. 62/858,081 filed on Jun. 6, 2019

FIELD OF THE INVENTION

The present invention relates generally to a cutting board. More particularly, cutting board with integrated food holders.

BACKGROUND OF THE INVENTION

Over a 100 k home cooks visit the Emergency Room every year for serious hand and finger knife injuries while using a regular cutting board to cut food with a knife. The helping hand is the most vulnerable. More than 3 million people in the United States have a disability in their hands or forearms including paralysis, or orthopedic impairments, either congenital or injury related. Each case is unique and different patients with congenital or injury related impairment are unable to use prosthetics to improve their quality of life.

Simple activities of daily living like food preparation for eating (cutting food, peeling, slicing) can become very challenging. Unavailability of assistive devices in the kitchen can lead to malnutrition. There exists cutting board with slicing guides holds the cutting article along cutting boards already, but these conventional devices are often flimsy in construction, resulting in premature wear on the cutting surface and/or guides. Additionally, these conventional devices are often limited in cutting a loose article one at a time. Previous designs like the tomato slicer available in the market have been made out of plastic. When the user's knife is passing through the slicing guides, the knife edge may cut of piece of the slicing guide plastic. The broken plastic now can fall into the user's food or vegetables that are being cut. Additionally, multi blade cutters available in the market requires holding the tool in one hand. The other hand must feed the vegetable to be sliced into the multi-blade cutter one at a time. It allows only cutting one piece of a loose vegetable like okra or French beans at a time. This one-handed operation is not safe. Furthermore, cutting scissors are available in the market that have an integrated cutting board. However, in those scissors, the cutting knife does not cut all the way through the vegetable cleanly. This helps prevent excessive scratching on the attached cutting board.

The present invention aims to solve and improve on these problems. The present invention is a cutting board with hinged fork holders to safely slice cutting articles. The present invention facilitates in cutting vegetables safely and easily in preparation for cooking or salad. It can help cut vegetables like cucumbers, carrots, zucchini, celery, potatoes, onions, and tomatoes. It is especially useful for vegetables that come in bunches like okra, French green beans, chives, spinach, and romaine lettuce. The user does not have to hold a loose bunch of vegetables with their hand. It may also be used to cut a long thin loaf of French bread. It may also be used to cut a soap bar. The present invention is designed to be user friendly to children and the elderly. A palm grip rest is provided along the side of a cutting board base. Gripping the palm grip rest prevents the base from sliding while the user is using the food holders. In common practice, the fingers of the left hand may come near the cutting motion of the knife. It is therefore an objective of the present invention to provide a cutting board with one or more fork holders that allow the user to physically secure a cutting article atop the cutting board while cutting the item in order to promote safety in the cutting process. When the present invention is in use, one hand of the user holds the handle away from the knife motion, while the user's other hand holds the knife and cuts the vegetables. This allows for safely cutting vegetables.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

SUMMARY OF THE INVENTION

The present invention is a cutting board apparatus. The cutting board apparatus comprises a cutting board base, at least one hinge, and at least one cutting article holder. In the preferred embodiment of the present invention, each of the cutting article holders is hingedly connected adjacent to the cutting board base through one of the at least one hinge. In the preferred embodiment of the present invention, the at least one hinge is a friction hinge.

In the preferred embodiment of the present invention, the cutting board apparatus serves as an ergonomic and user-friendly cutting aid. The cutting board apparatus may be used in any style of operation, such as, but not limited to one handed operation, two handed operation, or left/right-handed operations.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1, 3, and 4-5, the present invention is a cutting board apparatus 1. The cutting board apparatus 1 comprises a cutting board base 11, at least one hinge 12, and at least one cutting article holder 13. In the preferred embodiment of the present invention, the cutting board apparatus 1 serves as an ergonomic and user-friendly cutting aid. The cutting board apparatus 1 may be used in any style of operation, such as, but not limited to one handed operation, two handed operation, or left/right-handed operations.

Figure 1:
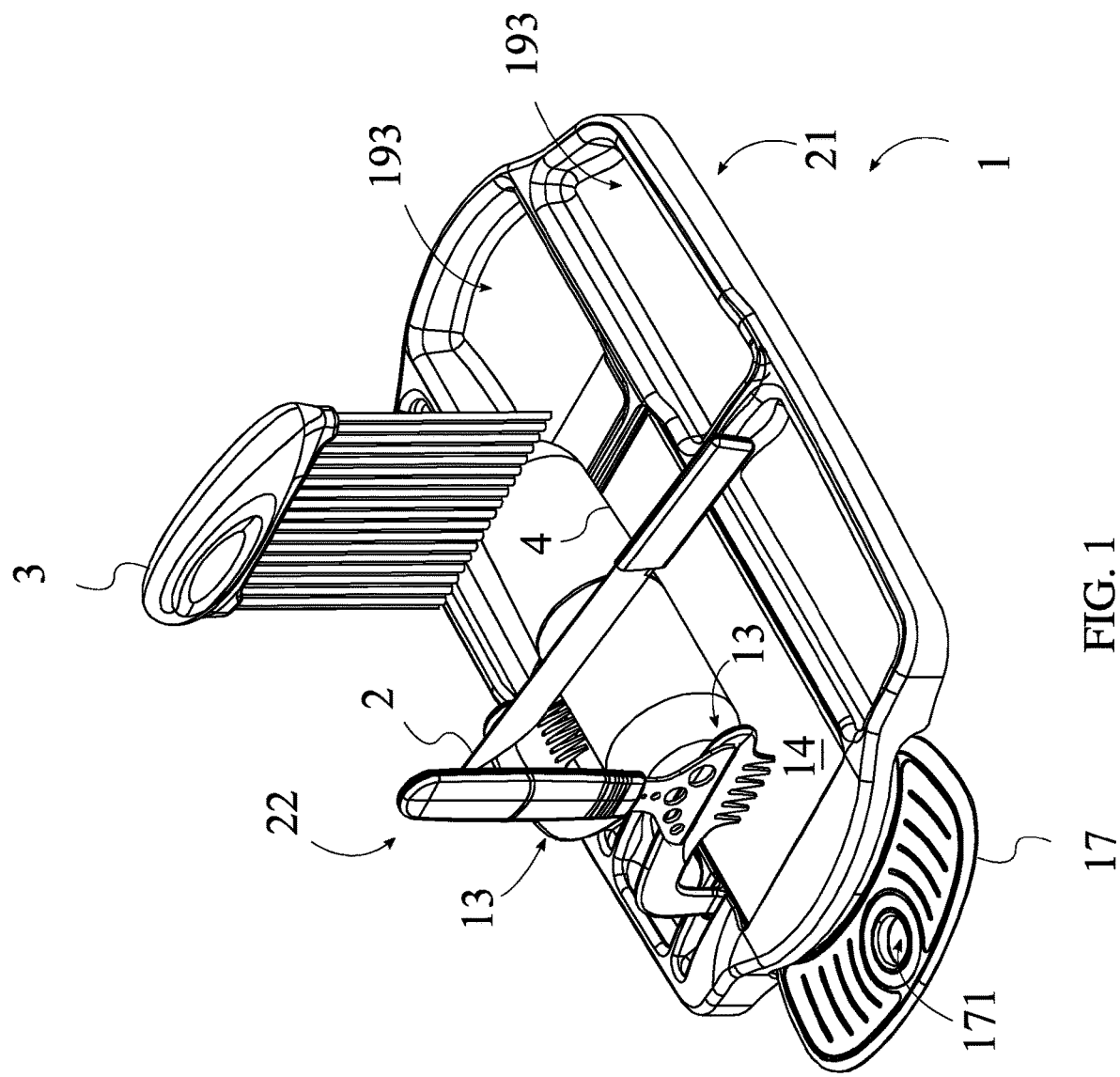
FIG. 1 is a top perspective view of the present invention.

In the preferred embodiment of the present invention, each of the cutting article holders 13 is hingedly connected adjacent to the cutting board base 11 through one of the at least one hinge 12, as shown in FIGS. 1-3 and 5. In the preferred embodiment of the present invention, the at least one hinge 12 is a friction hinge. The friction hinge allows the cutting article holder 13 to swivel and fix a cutting article 4 along the cutting board base 11. In various embodiments, the at least one hinge 12 may take the form of any suitable swivel locking implement, such as, but not limited to locking hinges, spring hinges, or any other suitable implement. In the preferred embodiment of the present invention, the cutting article 4 may take the form of a fork cutting article holder 13 that fixes the cutting article 4 along the cutting board base 11. In various embodiments, the cutting article holder 13 may take the form of any suitable holder implement such as but not limited to wire guides, retention cuffs, or any other suitable implement. The cutting board apparatus 1 allows the user to place and fix a cutting article 4 along the cutting board base 11 through the use of the hingedly placed cutting article holder 13. The user can then use a cutting knife 2, crinkle cutter 3, or any other cutting implement to cut the cutting article 4 in a uniform and safe manner as illustrated in FIG. 1. In the preferred embodiment of the present invention, the cutting board apparatus 1 can be made out of any material suitable for kitchen appliances such as, but not limited to dishwasher safe and durable polymers, stainless steel, aluminum, or any other suitable material.

In the preferred embodiment of the present invention, the cutting board apparatus 1 further comprises a cutting board insert 14, as shown in as shown in FIGS. 1-2, 4-5, and 13. The cutting board base 11 comprises an insert receptacle 111. The cutting board insert 14 is removably positioned within the insert receptacle 111. The removably placed cutting board insert 14 serves as a replaceable cutting board. When one side of the cutting board insert 14 wears out, the user can flip the cutting board insert 14 to the other side to start with a fresh cutting surface.

Figure 4:
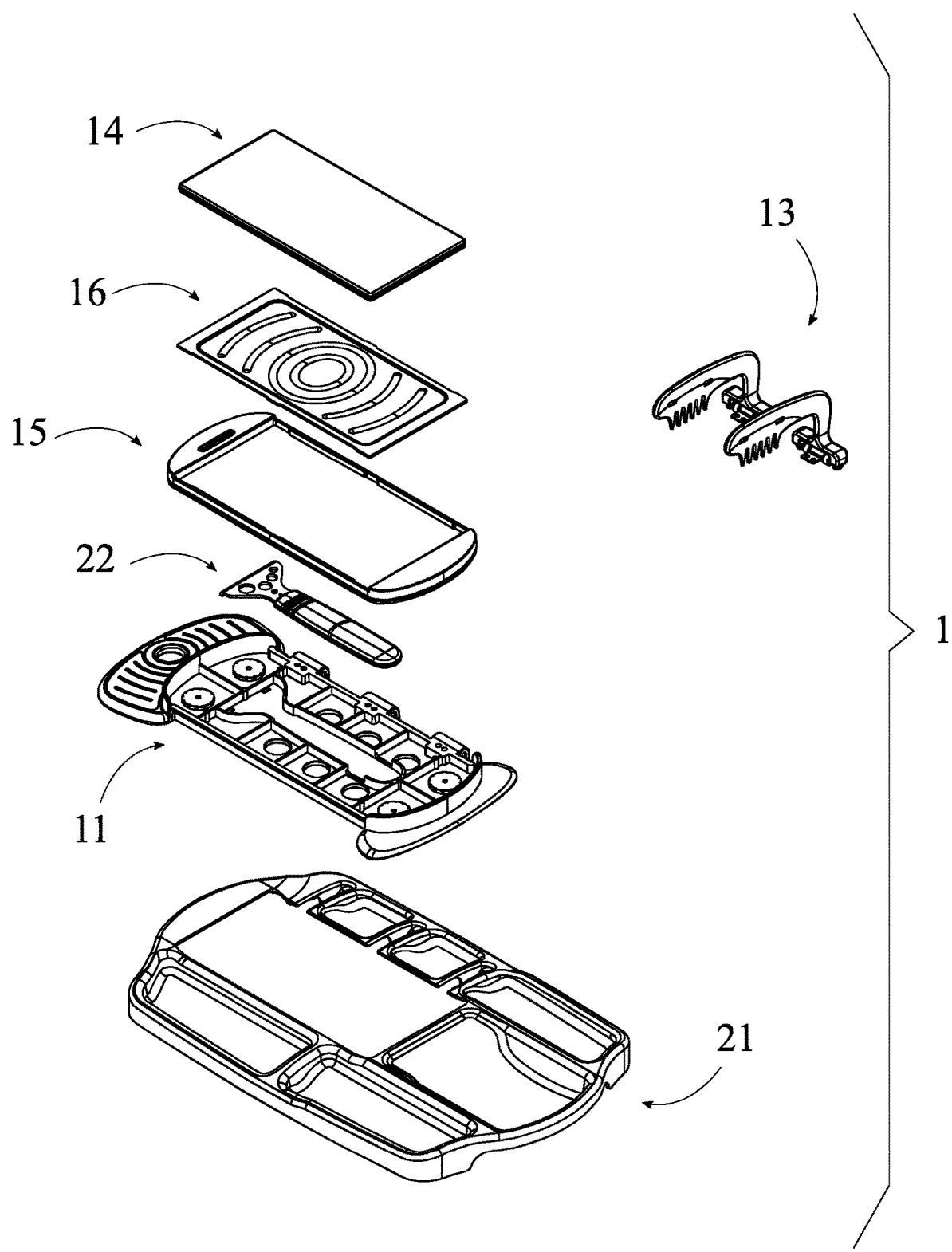
FIG. 4 is an exploded view of the present invention.
Figure 5:
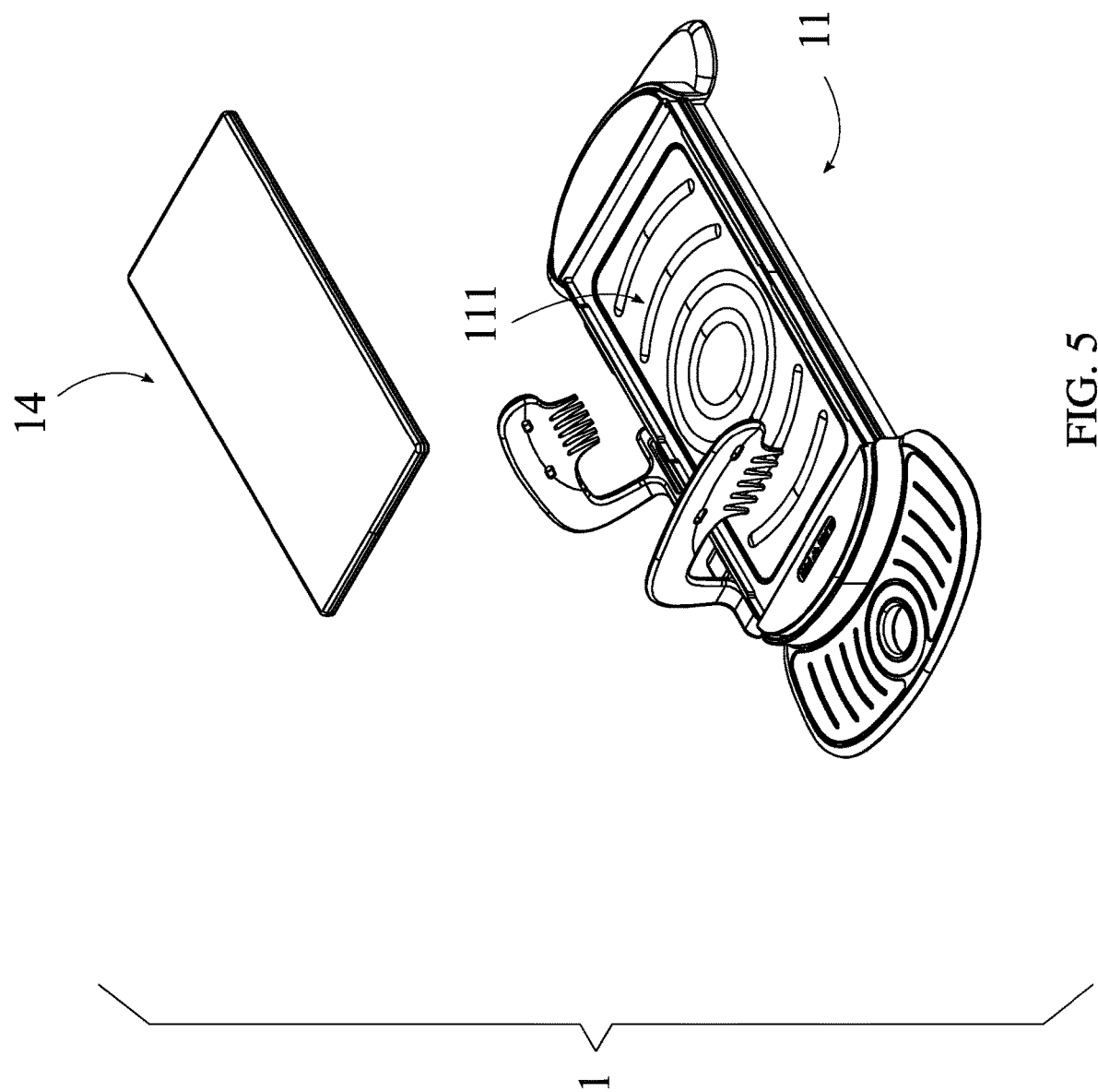
FIG. 5 is an exploded view of the present invention, in accordance to another embodiment.
Figure 6:
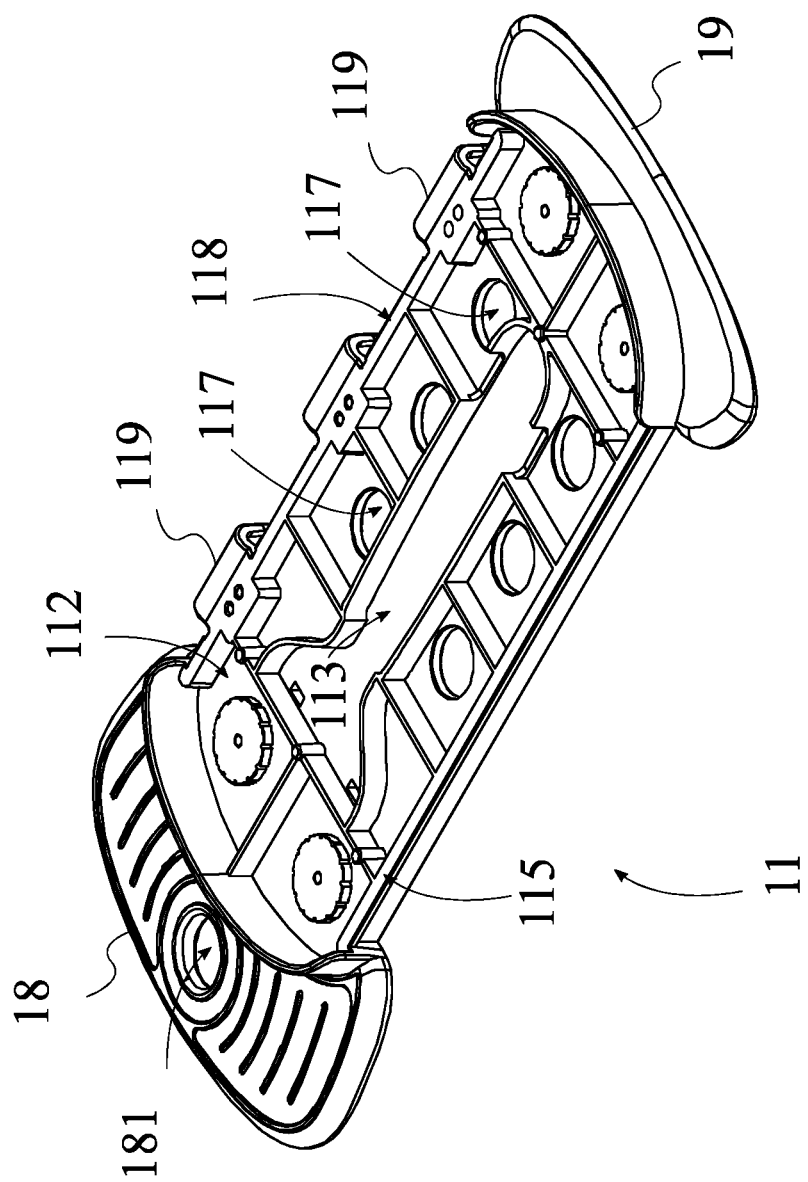
FIG. 6 is a perspective view of a cutting board base used in the present invention.
Figure 11:
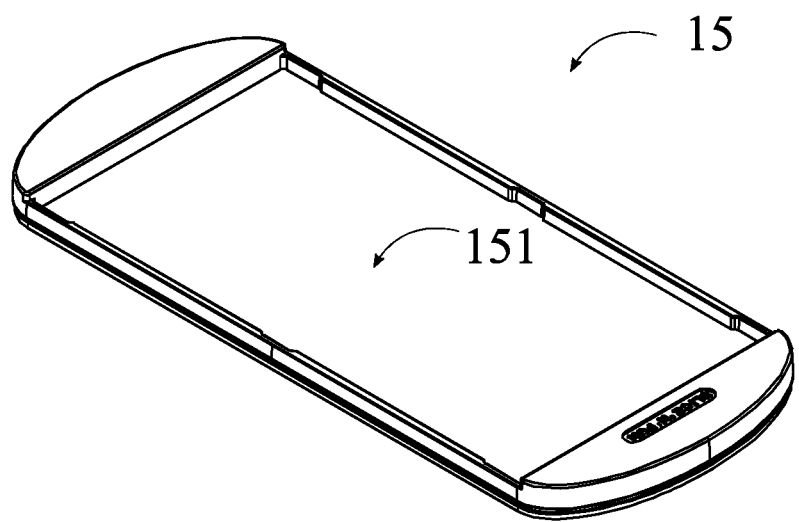
FIG. 11 is a perspective view of a mounting tray used in the present invention.
Figure 12:
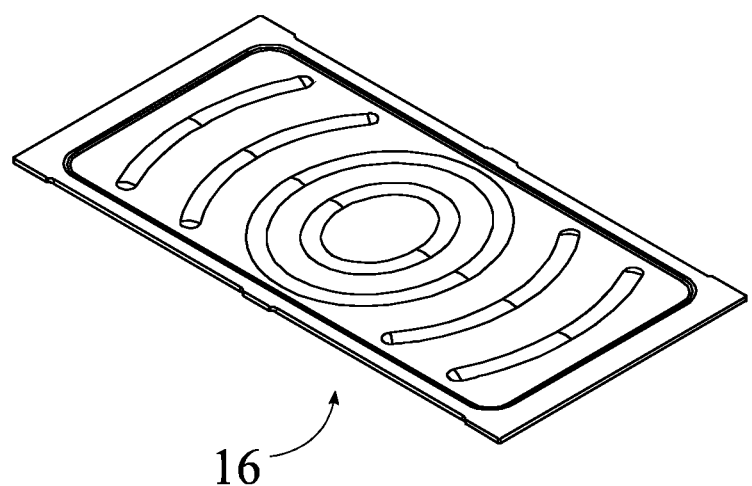
FIG. 12 is a perspective view of a grip layer used in the present invention.
Figure 13:
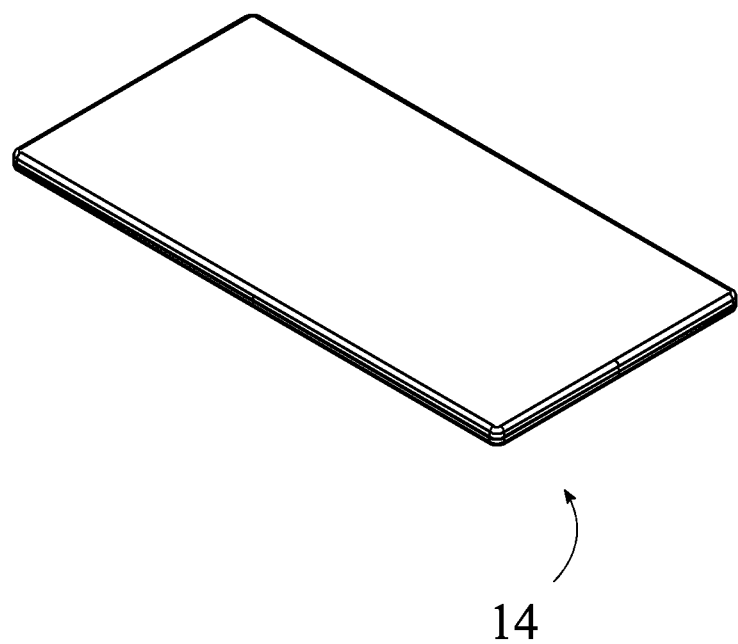
FIG. 13 is a perspective view of a cutting board insert used in the present invention.

In another embodiment of the present invention, the cutting board apparatus 1 further comprises a mounting tray 15, as shown in FIGS. 4 and 11. The cutting board base 11 further comprises a tray receptacle 112, as shown in FIG. 6. In this embodiment, the mounting tray 15 comprises the insert receptacle 111. The mounting tray 15 is removably positioned within the tray receptacle 112. The cutting board insert 14 is removably positioned within the insert receptacle 111 opposite to the cutting board base 11. The mounting tray 15 serves as a removable juice catch tray 21 that prevents juice or debris produced from the sliced cutting article 4 from intruding into the cutting board base 11. In the preferred embodiment of the present invention, the cutting board apparatus 1 further comprises a grip layer 16, as shown in FIGS. 4 and 12. The grip layer 16 is removably positioned between the insert receptacle 111 and the cutting board insert 14. The grip layer 16 may take the form of a silicone or rubber sheet insert that secures the cutting board insert 14 along the mounting tray 15.

In the preferred embodiment of the present invention, the cutting board base 11 comprises a wrench compartment 113, as shown in FIG. 6. The wrench compartment 113 is positioned within the cutting board base 11, where the wrench compartment 113 is configured to receive a cutting article wrench 22. In the preferred embodiment of the present invention, the cutting article wrench 22 facilitates additional leverage support for the cutting article holder 13 to secure the cutting article 4 to the cutting board insert 14.

Figure 3:
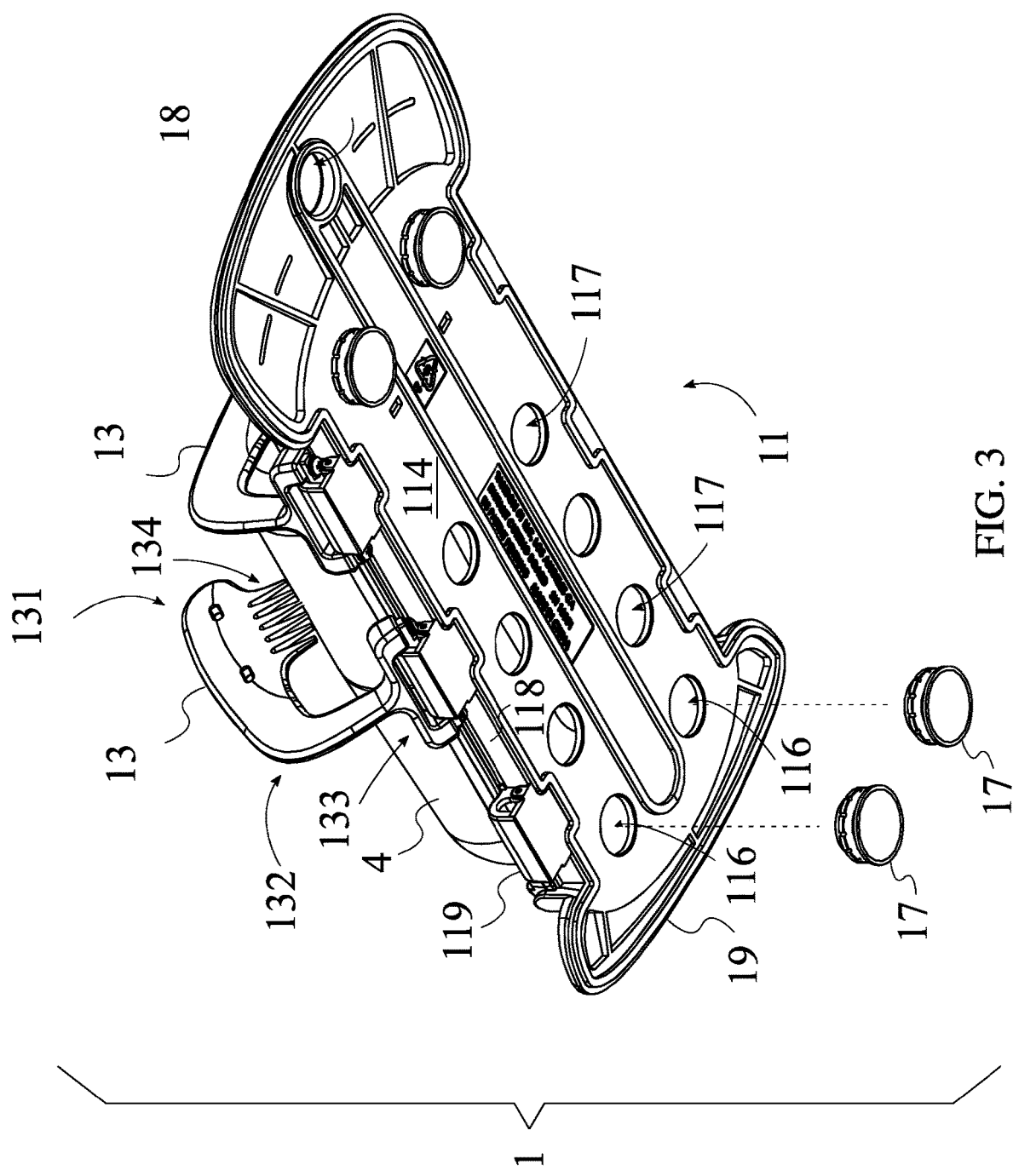
FIG. 3 is a bottom rear perspective view of the present invention without the catch tray.

In preferred embodiment of the present invention, the cutting board apparatus 1 further comprises a plurality of feet 17, as shown in FIG. 3. In reference to FIGS. 3 and 6, the cutting board base 11 further comprises a bottom surface 114, a plurality of feet apertures 116, and a plurality of drainage holes 117. The bottom surface 114 is positioned opposite to the insert receptacle 111. The plurality of feet apertures 116 is distributed about the bottom surface 114. The plurality of feet apertures 116 traverses through the bottom surface 114. Each of the plurality of feet 17 is connected adjacent to the bottom surface 114 through one of the plurality of feet apertures 116. In the preferred embodiment of the present invention, the plurality of feet 17 may take the form of suction cup members that allows the user to removably attach the cutting board apparatus 1 to a flat surface such as a kitchen countertop. This facilitates one-handed slicing operation. The plurality of drainage holes 117 is distributed about the cutting board base 11, as shown in FIGS. 3 and 6. The plurality of drainage holes 117 traverses through the cutting board base 11. In the preferred embodiment of the present invention, the plurality of drainage holes 117 allows liquids produced by the sliced cutting article 4 to seep through the cutting article 4 base.

In another embodiment of the present invention, the cutting board base 11 comprises a bottom surface 114, a top surface 115, a plurality of feet apertures 116, and a plurality of drainage holes 117. The top surface 115 traverses along the cutting board base 11, opposite to the bottom surface 114. The plurality of feet apertures 116 is distributed about the bottom surface 114. The plurality of feet apertures 116 traverses through the bottom surface 114. Each of the plurality of feet 17 is connected adjacent to the bottom surface 114 through one of the plurality of feet apertures 116. The plurality of drainage holes 117 is distributed about the cutting board base 11. The plurality of drainage holes 117 traverses through the cutting board base 11.

In the preferred embodiment of the present invention, the cutting board apparatus 1 further comprises an anchor platform 18 and a stabilizing member 19, as shown in FIGS. 1-3 and 6. The anchor platform 18 comprises a thumb hole 181. The anchor platform 18 and the stabilizing member 19 is terminally connected to the cutting board base 11 opposite to each other along the cutting board base 11. The anchor platform 18 serves as a handle for the cutting board base 11, allowing the user to place their helping hand along the anchor platform 18, anchoring the cutting board base 11 along the flat surface it is placed on. The thumb hole 181 traverses through the anchor platform 18. The thumb hole 181 allows the user to grasp the anchor platform 18 with their thumb. Additionally, the thumb hole 181 serves as a lanyard hole that allows the user to hang the cutting board apparatus 1 along a hook or peg hanger.

Figure 2:
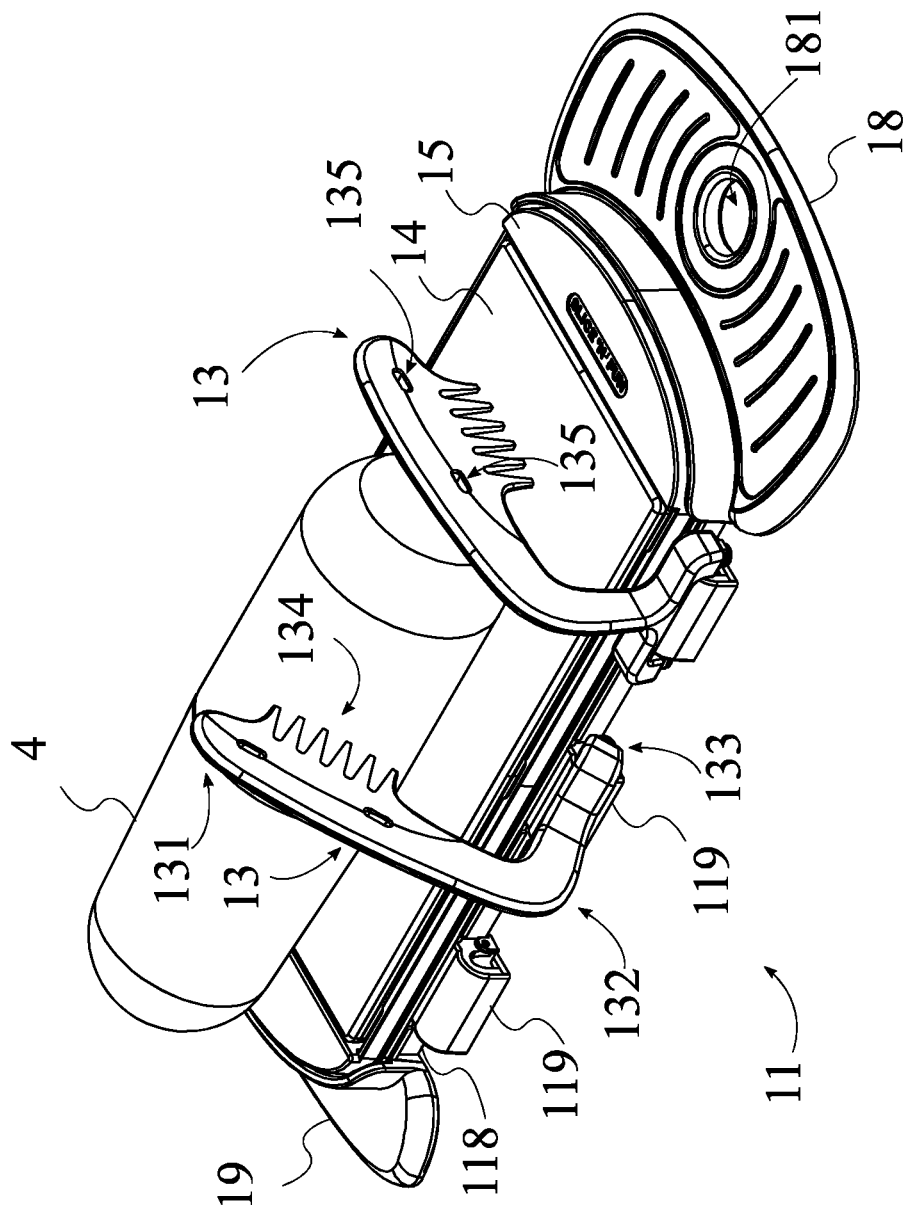
FIG. 2 is a rear perspective view of the present invention without a catch tray.

In the preferred embodiment of the present invention, the cutting board base 11 further comprises a mounting edge 118, and a plurality of hinge brackets 119, as shown in FIGS. 2-3 and 6. The mounting edge 118 is laterally positioned adjacent to the cutting board base 11. The plurality of hinge brackets 119 is distributed along the mounting edge 118. Each of the hinges 12 is removably attached to the cutting board base 11 through one of the hinge brackets. The mounting edge 118 is the portion of the cutting board base 11 that mounts the plurality of hinge brackets 119. The plurality of hinge brackets 119 serves as connectors that removably attaches the plurality of hinges to the cutting board.

Figure 7:
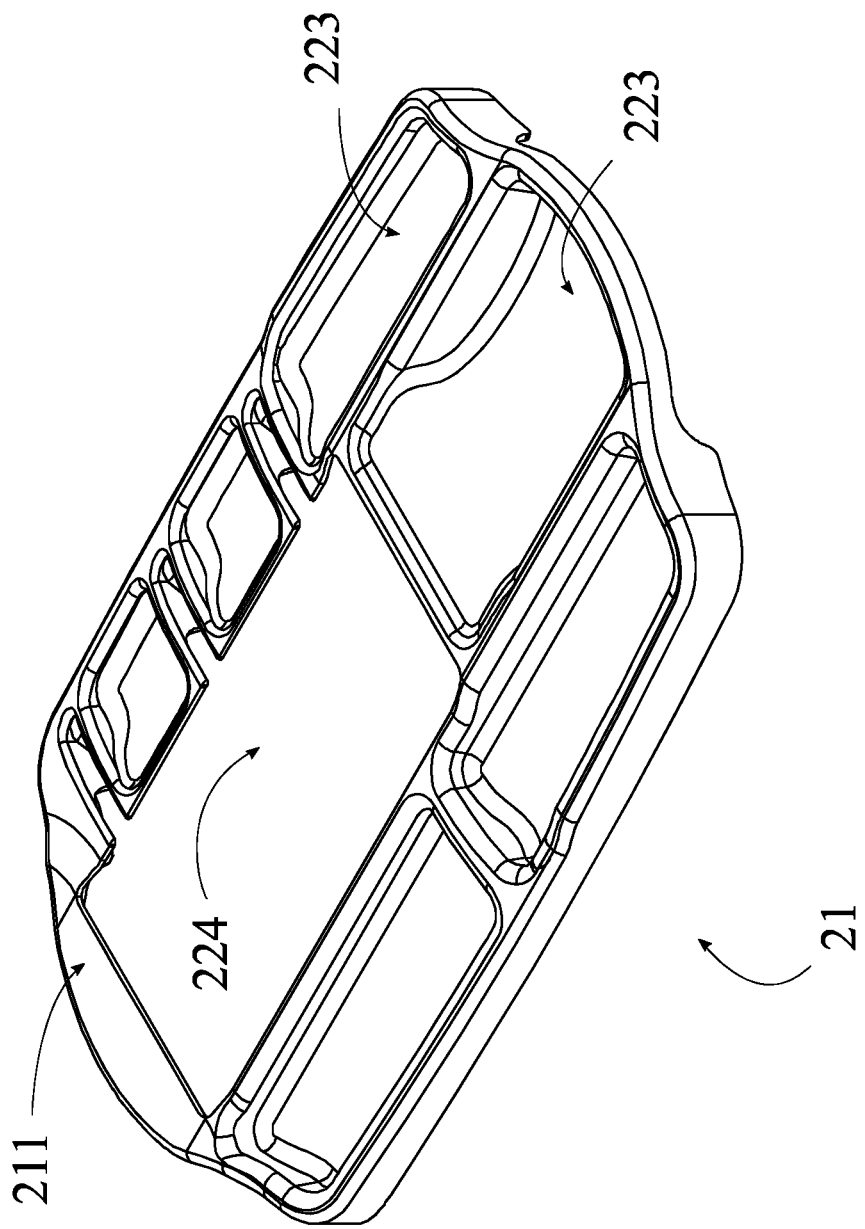
FIG. 7 is a top perspective view of the catch tray used in the present invention.
Figure 8:
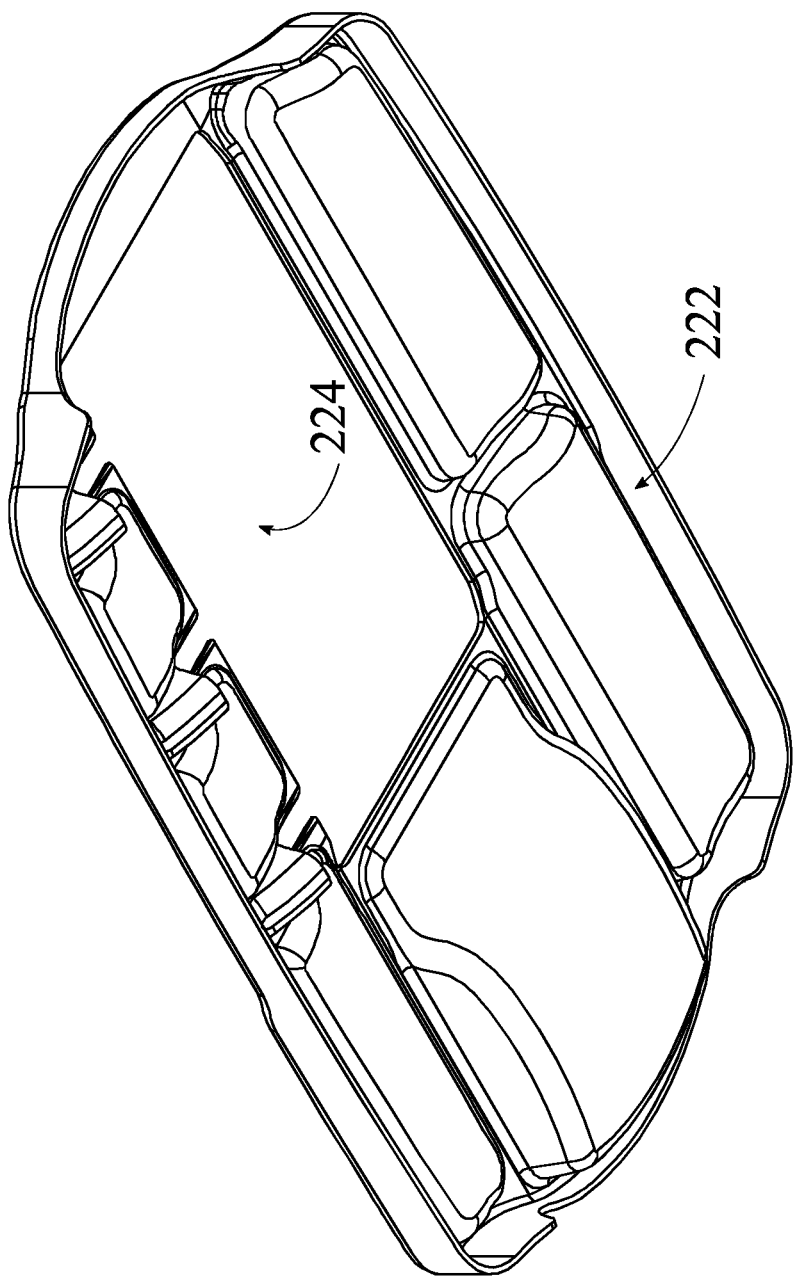
FIG. 8 is a bottom perspective view of the catch tray used in the present invention.

In the preferred embodiment of the present invention, the cutting board apparatus 1 further comprises a catch tray 21, as shown in FIGS. 1, 4, and 7-8. The catch tray 21 comprises a mounting cut-out 224. The mounting cut-out 224 traverses through the catch tray 21. The cutting board base 11 is removably positioned adjacent to the catch tray 21 through the mounting cut-out 224. The catch tray 21 serves as a cutting board organizer tray that allows the user to place cutting articles, refuse, or sliced items along the catch tray 21. The mounting cut-out 224 serves as an opening that flush fits and securely places the cutting board base 11 along the catch tray 21 and provides enough clearance for the plurality of hinges and the plurality of cutting article holders 13 to swing freely along the cutting board base 11. The catch tray 21 further comprises a top side 211, a bottom side 222, and a plurality of catch compartments 223, as shown in FIGS. 7-8. The top side 211 and the bottom side 222 are positioned opposite to each other on the catch tray 21. The plurality of catch compartments 223 is distributed about the top side 211 of the catch tray 21. The plurality of catch compartments 223 traverses into the top side 211. The plurality of catch compartments 223 serves as organizer compartments that allows the user to place cutting articles 4, refuse, or sliced items into each of the compartments.

Figure 9:
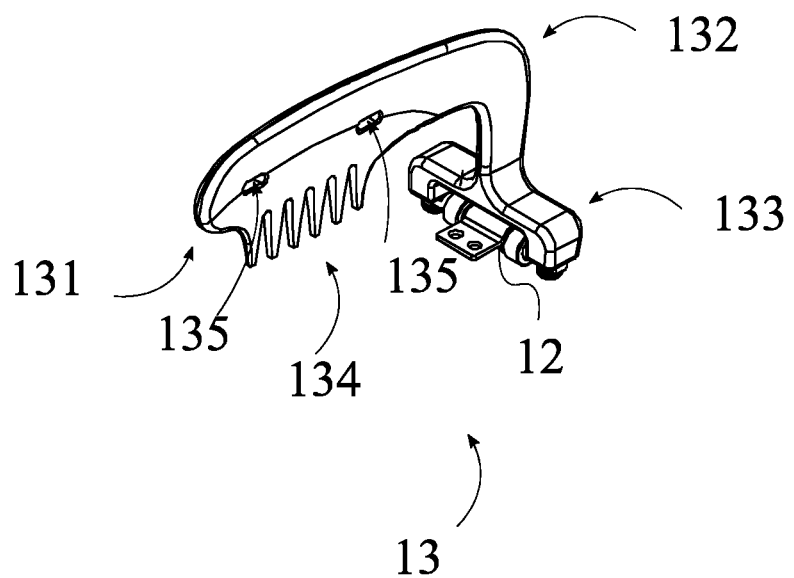
FIG. 9 is a perspective view of a cutting article holder and a hinge used in the present invention.
Figure 10:
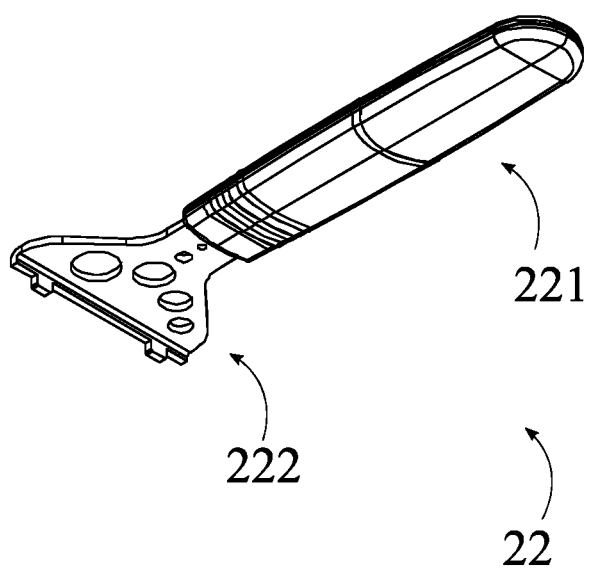
FIG. 10 is a perspective view of a cutting article wrench used in the present invention.

In the preferred embodiment of the present invention, the at least one cutting article holder 13 comprises a holder end 131, a holder body 132, a hinge connection end 133, and at least one restraining member 134, as shown in FIGS. 2-3, and 9. The holder end 131 and the hinge connection end 133 each is terminally positioned adjacent to the holder body 132. The holder end 131 is positioned opposite to the hinge connector end along the holder body 132. The hinge connection end 133 is connected adjacent to one of the at least one hinge 12. The at least one restraining member 134 is connected adjacent to the holder end 131. The restraining member serves as any suitable implement to retain and secure the cutting article 4 to the cutting article holder 13. In the preferred embodiment of the present invention, the restraining member comprises a plurality of tines. In various embodiments, the restraining member can be any suitable implement to retain and secure the cutting article 4 to the cutting article holder 13 such as but not limited to retention cuffs, wire holders, or any other suitable implement.

In the preferred embodiment of the present invention, the cutting board apparatus 1 further comprises a plurality of wrench apertures 135, as shown in FIG. 9. The plurality of wrench apertures 135 is distributed about the holder body 132, adjacent to the restraining member. The plurality of wrench apertures 135 traverses through the holder body 132. In the preferred embodiment of the present invention, the cutting board apparatus 1 further comprises a cutting article wrench 22. The cutting article wrench 22 comprises a wrench handle 221 and a wrench head 222. The wrench handle 221 is connected adjacent to the wrench head 222. The plurality of wrench apertures 135 is configured to receive the wrench head 222, where the cutting article wrench 22 is removably attached to the holder body 132 in order to facilitate additional leverage support for the cutting article holder 13. The wrench handle 221 serves as the grasping member of the cutting article wrench 22.

Although the invention has been explained in relation to its preferred embodiment, it is to be understood that many other possible modifications and variations can be made without departing from the spirit and scope of the invention as hereinafter claimed.

What is claimed is:

1. A cutting board apparatus comprising:
a cutting board base;
at least one hinge;
at least one cutting article holder;
each of the cutting article holders being hingedly connected adjacent to the cutting board base through one of the at least one hinge;
a cutting board insert;
a mounting tray;
the cutting board base comprising a tray receptacle;
the mounting tray comprising an insert receptacle;
the mounting tray being removably positioned within the tray receptacle; and
the cutting board insert being removably positioned within the insert receptacle opposite to the cutting board base.

2. The cutting board apparatus as claimed in claim 1 comprising:
the cutting board base comprising an insert receptacle; and
the cutting board insert being removably positioned within the insert receptacle.

3. A cutting board apparatus comprising:
a cutting board base;
at least one hinge;
at least one cutting article holder;
each of the cutting article holders being hingedly connected adjacent to the cutting board base through one of the at least one hinge;
a cutting board insert;
the cutting board base comprising an insert receptacle;
the cutting board insert being removably positioned within the insert receptacle;
a grip layer; and
the grip layer being removably positioned between the insert receptacle and the cutting board insert.

4. The cutting board apparatus as claimed in claim 1 comprising:

the cutting board base comprising a wrench compartment; and the wrench compartment positioned within the cutting board base, wherein the wrench compartment is configured to receive a cutting article wrench.

5. The cutting board apparatus as claimed in claim 1 comprising:
a plurality of feet;
the cutting board base comprising a bottom surface, a top surface, a plurality of feet apertures, and a plurality of drainage holes
the top surface traversing along the cutting board base, opposite to the bottom surface;
the plurality of feet apertures being distributed about the bottom surface;
the plurality of feet apertures traversing through the bottom surface;
each of the plurality of feet being connected adjacent to the bottom surface through one of the plurality of feet apertures;
the plurality of drainage holes being distributed about the cutting board base; and
the plurality of drainage holes traversing through the cutting board base.

6. The cutting board apparatus as claimed in claim 2 comprising:
a plurality of feet;
the cutting board base comprising a bottom surface, a plurality of feet apertures, and a plurality of drainage holes
the bottom surface being positioned opposite to the insert receptacle of the cutting board base;
the plurality of feet apertures being distributed about the bottom surface;
the plurality of feet apertures traversing through the bottom surface;
each of the plurality of feet being connected adjacent to the bottom surface through one of the plurality of feet apertures;
the plurality of drainage holes being distributed about the cutting board base; and
the plurality of drainage holes traversing through the cutting board base.

7. The cutting board apparatus as claimed in claim 1 comprising:
an anchor platform;
a stabilizing member;
the anchor platform comprising a thumb hole;
the anchor platform and the stabilizing member being terminally connected to the cutting board base opposite to each other along the cutting board base; and
the thumb hole traversing through the anchor platform.

8. A cutting board apparatus comprising:
a cutting board base;
at least one hinge;
at least one cutting article holder;
each of the cutting article holders being hingedly connected adjacent to the cutting board base through one of the at least one hinge;
the cutting board base comprising a mounting edge, and a plurality of hinge brackets;
the mounting edge being laterally positioned adjacent to the cutting board base;

the plurality of hinge brackets being distributed along the mounting edge; and
each of the hinges being removably attached to the cutting board base through one of the hinge brackets.

9. The cutting board apparatus as claimed in claim 1 comprising:
a catch tray;
the catch tray comprising a mounting cut-out;
the mounting cut-out traversing through the catch tray; and
the cutting board base being removably positioned adjacent to the catch tray through the mounting cut-out.

10. The cutting board apparatus as claimed in claim 9 comprising:
the catch tray further comprising a top side, a bottom side, and a plurality of catch compartments;
the top side and the bottom side being positioned opposite to each other on the catch tray;
the plurality of catch compartments being distributed about the top side of the catch tray; and
the plurality of catch compartments traversing into the top side.

11. The cutting board apparatus as claimed in claim 1 comprising:
the at least one cutting article holder comprising a holder end, a holder body, a hinge connection end, and at least one restraining member;
the holder end and the hinge connection end each being terminally positioned adjacent to the holder body;
the holder end being positioned opposite to the hinge connector end along the holder body;
the hinge connection end being connected adjacent to one of the at least one hinge; and
the at least one restraining member being connected adjacent to the holder end.

12. The cutting board apparatus as claimed in claim 11 comprising:
a plurality of wrench apertures;
the plurality of wrench apertures being distributed about the holder body, adjacent to the restraining member; and
the plurality of wrench apertures traversing through the holder body.

13. The cutting board apparatus as claimed in claim 12 comprising:
a cutting article wrench;
the cutting article wrench comprising a wrench handle and a wrench head;
the wrench handle being connected adjacent to the wrench head; and
the plurality of wrench apertures being configured to receive the wrench head, wherein the cutting article wrench is removably attached to the holder body in order to facilitate additional leverage support for the cutting article holder.

14. The cutting board apparatus as claimed in claim 1, wherein the atleast one hinge is a friction hinge.

15. The cutting board apparatus as claimed in claim 11, wherein the atleast one restraining member comprises a plurality of tines.

* * * * *